United States Patent [19]

Connell

[11] 3,726,541

[45] Apr. 10, 1973

[54] DOLLY-TYPE TANDEM AXLE SUSPENSION

[76] Inventor: Raymond C. Connell, 170 Sunset Drive, Burbank Heights, Pasco, Wash. 99301

[22] Filed: Nov. 27, 1970

[21] Appl. No.: 93,234

[52] U.S. Cl. .......................... 280/106.5 R, 180/73 R
[51] Int. Cl. ............................................. B62d 21/00
[58] Field of Search .......................... 280/106.5 R; 180/73 R, 56

[56] References Cited

UNITED STATES PATENTS

| | | | |
|---|---|---|---|
| 2,369,501 | 2/1945 | Wagner | 180/73 R |
| 1,046,388 | 12/1912 | Hill | 180/73 R |
| 2,041,936 | 5/1936 | Kliewer | 280/106.5 R |
| 1,495,171 | 5/1924 | Fraser | 280/106.5 R |

FOREIGN PATENTS OR APPLICATIONS

| | | | |
|---|---|---|---|
| 1,251,019 | 12/1960 | France | 280/106.5 R |
| 1,190,149 | 3/1959 | France | 280/106.5 R |

Primary Examiner—Philip Goodman
Attorney—Clarence A. O'Brien and Harvey B. Jacobson

[57] ABSTRACT

A load supporting vehicle including a main frame defining four corner portions and also provided with an underlying running gear frame defining four similar corner portions disposed beneath the first mentioned corner portions. The running gear frame includes longitudinally spaced tandem axle assemblies whose opposite end portions are disposed adjacent the corresponding main frame and running gear frame corner portions. Compression spring means are operatively connected between the pairs of corresponding main frame and running gear frame corner portions and a pair of generally V-shaped radius arms are provided and have the free ends of the legs thereof pivotally supported from the running gear frame for oscillation about horizontal transverse axes spaced longitudinally of the running gear frame and the apex portions of the V-shaped radius arms are swivelly connected to adjacent portions of the main frame spaced forwardly of the aforementioned axes with the V-shaped radius arms generally horizontally disposed.

9 Claims, 5 Drawing Figures

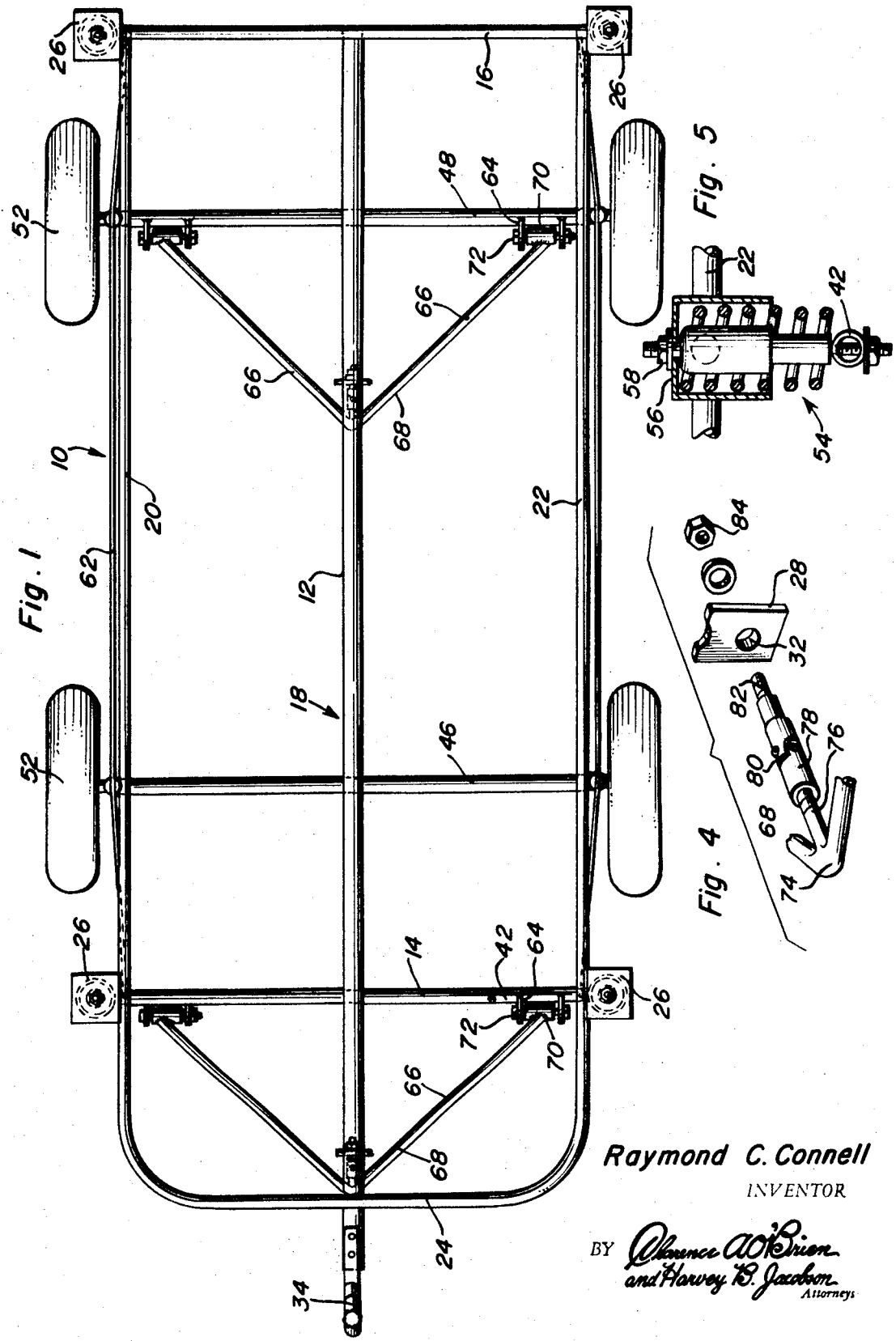

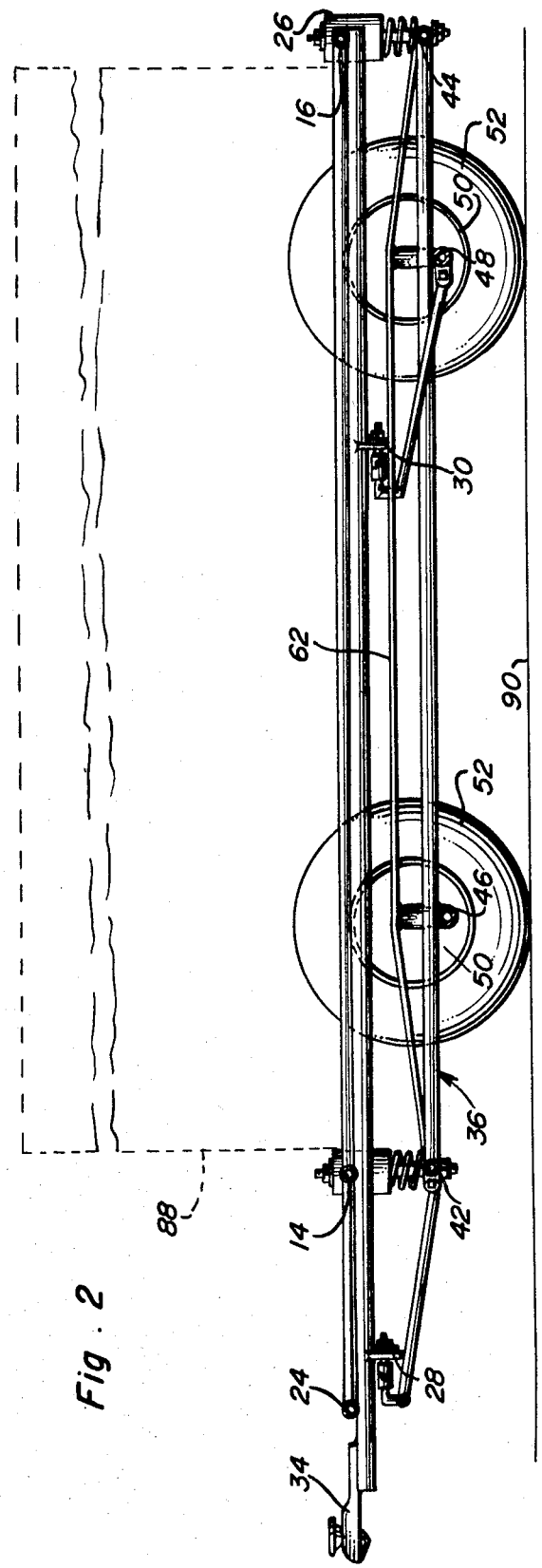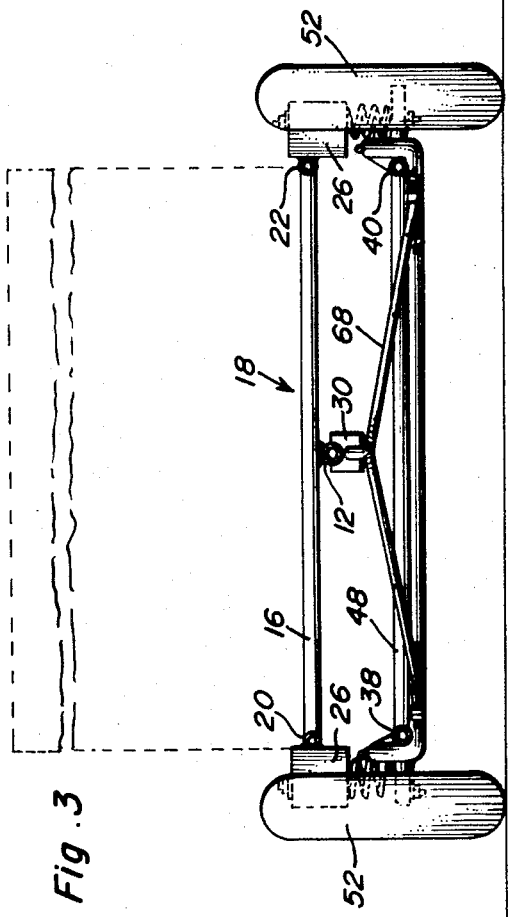

DOLLY-TYPE TANDEM AXLE SUSPENSION

The tandem axle suspension assembly of the instant invention utilizes rigid main and running gear frames including four pairs of corresponding vertically spaced corner portions with the running gear frame corner portions spaced below the main frame corner portions and compression springs are connected between corresponding corner portions fro spring suspending the main frame from the running gear frame. The running gear frame is provided with longitudinally spaced rigid tandem axle assemblies spaced further apart than usual so as to be spaced closely relative to the corresponding main and running gear frame corner portions. Further, radius arms oscillatably supported from one of the frames and swivelly connected to the other frame are provided for maintaining vertical registry of the main and running gear frames. In this manner, should one of the wheels journaled from one of the axles experience deflation of its associated tire, any tendency of the corresponding corner portion of the running gear frame to be lowered as a result of deflation of the tire will cause similar upward movement of the diagonally opposite corner portion of the running gear frame, which upward movement is resisted by the associated coil spring. Accordingly, assuming that the vehicle of the instant invention is disposed on at least a generally horizontal support surface, it is fully capable of operating, while at somewhat reduced capacity, as a load supporting vehicle. In fact, should one of the wheels of the tandem axle assembly be completely removed, that axle end will not be allowed to be lowered to the supporting surface because of the increased compression of the diagonally opposite compression spring as the axle end from which the wheel was removed is partially lowered toward the supporting surface for the vehicle.

Although the tandem axle suspension assembly of the instant invention may be utilized on various types of vehicles with the tandem axle assemblies of the invention comprising front and rear axles of these various types of vehicles, the suspension assembly has been specifically designed for use on trailers inasmuch as the loss of air pressure in one of the wheels of a trailer is not readily noticed by the driver of the towing vehicle since the resultant bumping and vibration of the flat tire while the trailer is in motion is not readily transmitted to the towing vehicle so as to be noticed by its driver.

Further, the tandem axle suspension of the instant invention offers inherent soft riding properties which are not usually associated with conventional tandem axle assemblies utilizing more closely spaced tandem axles and these soft riding properties of the suspension system of the instant invention are in part a result of the substantially full floating suspension of the main frame from the running gear frame, even though the unsprung weight of a trailer or vehicle constructed in accordance with the present invention is considerably greater than the unsprung weight of more conventional suspension systems.

Still further, because of the particular manner in which the main frame portion of the instant invention is spring supported at its four corners from the corresponding four corners of the running gear frame considerably less pitching and rolling or leaning of the main frame is encountered. In addition, the utilization of a pair of V-shaped radius arms in maintaining the main frame in vertical registry with the running gear frame considerably lessens the transmission of road shocks to the main frame and also enables the running gear frame to yield in oscillating crablike manner when extremely rough road surface irregularities are encountered so as to lessen the shock of these rough road surface irregularities on the unsprung running gear frame.

The main object of this invention is to provide a tandem axle suspension system designed primarily for use on trailer type vehicles of the tandem axle type and including inherent operating characteristics which will not allow more than a small percentage of he normal load carried by a properly inflated tire of the trailer to remain loaded upon that tire when it becomes deflated.

Another object of this invention, in accordance with the immediately preceding object, is to provide a tandem axle suspension assembly for use in the construction of trailers and having operating characteristics which serve to greatly reduce the tendency of the main frame of the trailer to pitch and roll under operating conditions which normally tend to cause pitch and roll.

Yet another object of this invention is to provide a tandem axle suspension system in accordance with the preceding objects and including structural features which spring support the main frame of the associated vehicle in a substantially full floating manner.

Another very important object of this invention is to provide a tandem axle suspension system for use in the construction of trailers which will inherently transfer less road shocks to the main frame of the trailer.

Still another object of this invention is to provide a tandem axle suspension assembly in accordance with the preceding objects and constructed in a manner whereby the running gear frame portion thereof may yield in crab-like manner when extremely rough road surface irregularities are encountered.

A final object of this invention to be specifically enumerated herein is to provide a tandem axle suspension assembly which will conform to conventional forms of manufacture, be of simple construction and efficient in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of a trailer incorporating the tandem axle suspension of the instant invention;

FIG. 2 is a side elevational view of the assemblage illustrated in FIG. 1;

FIG. 3 is a transverse vertical sectional view taken substantially upon a plane disposed immediately forward of the rear V-shaped radius arm of the trailer and looking in a rearward direction;

FIG. 4 is a fragmentary exploded perspective view illustrating the swivel connection between one of the V-shaped radius arms and the center beam of the main frame of the trailer; and FIG. 5 is a fragmentary enlarged vertical sectional view taken substantially upon a plane passing through one of the corner portions of the trailer.

Referring now more specifically to the drawings, the numeral 10 generally designates a trailer constructed in accordance with the present invention. The trailer 10 includes a center longitudinal beam 12 and a pair of front and rear transverse beams 14 and 16. In addition, the longitudinal beam 12 and transverse beams 14 and 16 comprise basic components of a main frame referred to in general by the reference numeral 18 and it may be seen from FIGS. 1 through 3 of the drawings that the main frame 18 also includes a pair of opposite side longitudinally extending peripheral members 20 and 22 secured at their rear ends to the opposite ends of the transverse beam 16 and interconnected at their forward ends by means of a forward transverse peripheral member 24 extending over and secured to the front end of the longitudinal beam 16.

Four generally square and downwardly opening closed top housings 26 are supported from the opposite ends of the transverse beams 14 and 16 for a purpose to be hereinafter more fully set forth and the main frame longitudinal beam includes a pair of longitudinally spaced dependingly supported anchor flanges 28 and 30 having bores 32 formed therethrough. In addition, the forward end of the longitudinal beam 12 includes a conventional socket hitch assembly for connection of the forward end of the trailer 10 to a conventional ball hitch member carried by a towing vehicle.

In addition to the main frame 18, the trailer 10 includes a running gear frame referred to in general by the reference numeral 36 including opposite side longitudinal members 38 and 40 interconnected at their corresponding front and rear ends by means of transverse members 42 and 44. Also, the running gear frame 36 includes front and rear rigid axles 46 and 48 of the drop center type whose center portions have their opposite ends passed beneath and secured to the longitudinal members 38 and 40. The opposite ends of the axles 46 and 48 each has a wheel 50 journaled thereon and each wheel 50 is provided with a pneumatic tire 52.

Combined compression spring and shock absorber assemblies referred to in general by the reference numeral 54 are provided, one each for each of the housings 26 and the upper ends of the assemblies 54 are secured through the top walls 56 of the housings 26 by means of fasteners 58 while the lower ends of the assemblies 54 are secured through the opposite ends of the transverse members 42 and 44 which define extensions projecting outwardly from the remote sides of the longitudinal members 38 and 40. Thus, the four corner portions of the main frame 18 are spring suspended from the corresponding four corners of the running gear frame 36 and shock absorber means is also provided between corresponding corner portions of the frames 18 and 36.

Rigid truss bars 62 have their opposite ends secured to the opposite ends of the longitudinal members 38 and 40 and extend longitudinally of the latter. In addition, the truss bars or rods 62 are secured over the upwardly offset opposite ends of the axles 46 and 48.

The axle 48 and transverse member 42 have opposite end pairs of forwardly directed apertured mounting ears 64 secured thereto and the free ends of the legs 66 of a pair of V-shaped radius arms 68 have sleeve portions 70 secured thereto and these sleeve portions are pivotally supported between pairs of the mounting ears or mounting brackets 64 by means of pivot fasteners 72. The apex portions 74 of the radius arms 68 include rearwardly directed angle bisecting threaded shank portions 76 onto which the internally threaded corresponding ends 78 of a pair of universal joints 80 are threaded. The rear ends or sections of the universal joints 80 include similar shank portions 82 secured through the apertures or bores 32 in the mounting lugs or flanges 28 by means of fasteners 84. Accordingly, the forward ends of the radius arms 68 are swivelly connected to the longitudinal beam 12 of the main frame 18.

In operation, the trailer 10 may be coupled to a towing vehicle by means of the socket hitch assembly 34. Then, with a load 88 as represented by the phantom line showing in FIG. 2 of the drawings placed upon the main frame 18, the spring suspension of the load 88 by the assemblies 54 is concentrated at the four corners of the load 88 and thereby resists rolling and pitching of the main frame 18 and load 88 relative to the running gear frame 36. In addition, deflation of one of the tires 52 will cause the corresponding corner of the running gear frame 36 to drop slightly toward the supporting surface 90 upon which the trailer 10 is disposed. However, any tendency of one corner portion of the running gear frame 36 to drop toward the supporting surface 90 is resisted by a corresponding upward movement of the diagonally opposite corner of the running gear frame and the spring and shock absorber assembly 54 acting thereon. Accordingly, only a small fraction of the normal load supported by one of the tires 52 is supported therefrom should that tire 52 become deflated. Also, inasmuch as the main frame 18 is supported from the running gear frame 36 in substantially a full floating manner, an extremely smooth ride is afforded the load 88. Still further, when extremely rough road irregularities are encountered by the tires 52, road shocks are not readily transmitted to the main frame 18 and the running gear frame 36 is capable of being displaced in crab fashion, a limited amount, relative to the main frame so as to yield under severe road shocks.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle including a main frame superposed relative to a running gear frame, said frames being rigid and including pairs of adjacent corresponding front and rear opposite side corner portions, spring means operatively connected between each pair of corresponding corner portions and spring supporting said main frame corner portions relative to said running gear corner portions, registry maintaining means operatively connected between said frames allowing for relative pitch and roll of said frames and resisting relative horizontal displacement of said frames in both longitudinal and transverse directions, and a pair of front and rear rigid transverse axle members supported from said running gear frame with the opposite ends of said front and rear axles being disposed adjacent the corresponding front and rear corners of said frames, said registry maintaining means including means enabling slight limited relative yawling of said frames about an upstanding axis, said registry maintaining means comprising a pair of generally horizontally disposed V-shaped radius arms with the free ends of the legs of each of said arms pivotally secured to one of said frames for oscillation about aligned horizontal transverse axes and the apex portion of each of said arms swively supported from the other of said frames at a point disposed in an upstanding plane extending generally along the center line of said other frame.

2. The combination of claim 1 wherein said frames are vertically spaced, said spring means including an upstanding compression type coil spring at each pair of corresponding corners of said frames, the upper and lower ends of each coil spring bearing upwardly and downwardly, respectively, on the corresponding main frame and running gear frame corners.

3. The combination of claim 1 wherein said one frame comprises said main frame.

4. The combination of claim 1 wherein said vehicle comprises a tandom axle trailer having a forwardly projecting tongue for attachment to a towing vehicle.

5. In combination, a vehicle including a main frame superposed relative to a running gear frame, said frames being rigid and including pairs of adjacent corresponding front and rear opposite side corner portions, spring means operatively connected between each pair of corresponding corner portions and spring supporting said main frame corner portions relative to said running gear corner portions, registry maintaining means operatively connected between said frame allowing for relative pitch and roll of said frames and resisting relative horizontal displacement of said frames in both longitudinal and transverse directions, and a pair of front and rear rigid transverse axle members supported from said running gear frame with the opposite ends of said front and rear axles being disposed adjacent the corresponding front and rear corners of said frames, said frames being vertically spaced, said spring means including an upstanding compression type coil spring at each pair of corresponding corners of said frames, the upper and lower ends of each coil spring bearing upwardly and downwardly, respectively, on the corresponding main frame and running gear frame corners, said spring means also including airplane type shock absorbers disposed within said coil springs and having their opposite ends connected to said main and running gear frames.

6. The combination of claim 5 wherein said registry maintaining means includes enabling slight limited relative yawling of said frames about an upstanding axis.

7. The combination of claim 6 wherein aid registry maintaining means comprises a pair of generally horizontally disposed V-shaped radius arms with the free ends of the legs of each of said arms pivotally secured to one of said frames for oscillation about aligned horizontal transverse axes and the apex portion of each of said arms swively supported from the other of said frames at a point disposed in an upstanding plane extending generally along the center line of said other frame.

8. The combination of claim 7 wherein said one frame comprises said main frame.

9. The combination of claim 5 wherein said registry maintaining means includes means enabling slight limited relative yawling of said frames about an upstanding axis.

* * * * *